(No Model.)
T. J. HERRING.
FIFTH WHEEL.
No. 554,268. Patented Feb. 11, 1896.
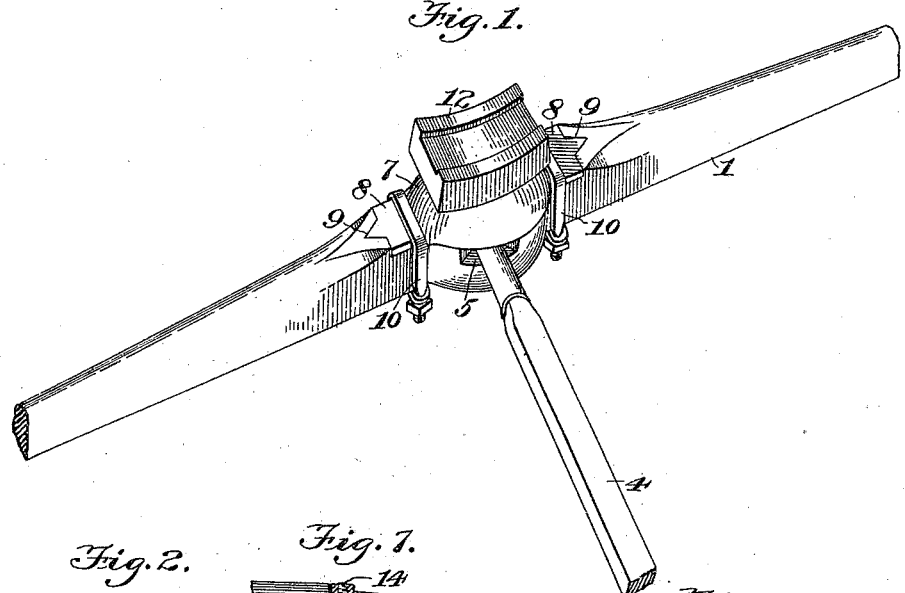
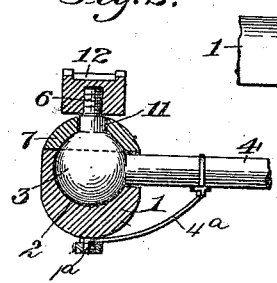
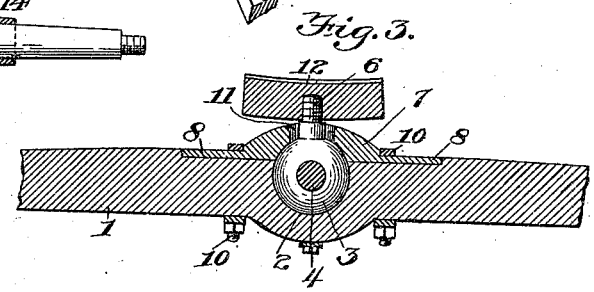
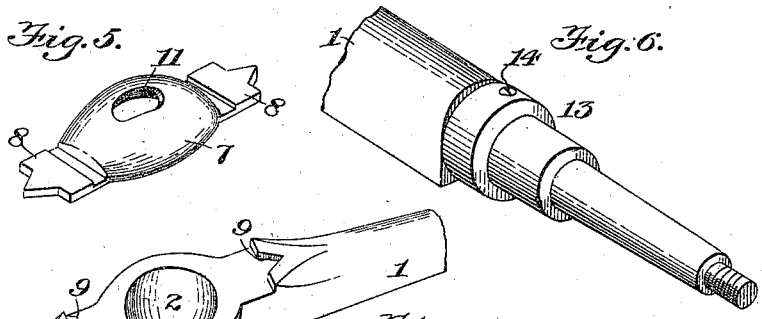
Witnesses
C. W. Smith
H. F. Riley
Inventor
Telemachus J. Herring
By his Attorneys.
C. A. Snow & Co.

UNITED STATES PATENT OFFICE.

TELEMACHUS J. HERRING, OF SAVANNAH, TENNESSEE.

FIFTH-WHEEL.

SPECIFICATION forming part of Letters Patent No. 554,268, dated February 11, 1896.

Application filed May 25, 1895. Serial No. 550,675. (No model.)

*To all whom it may concern:*

Be it known that I, TELEMACHUS J. HERRING, a citizen of the United States, residing at Savannah, in the county of Hardin and State of Tennessee, have invented a new and useful Running-Gear, of which the following is a specification.

The invention relates to improvements in running-gears.

The object of the present invention is to improve the construction of running-gear for vehicles, to dispense with the ordinary fifth-wheel, and to enable the wear of the spindles to be readily taken up and counteracted.

The invention consists in the construction and novel combination and arrangement of parts hereinafter fully described, illustrated in the accompanying drawings, and pointed out in the claims hereto appended.

In the drawings, Figure 1 is a perspective view of a portion of a running-gear constructed in accordance with this invention. Fig. 2 is a detail sectional view of the front axle, taken longitudinally of the reach. Fig. 3 is a similar view, the section being taken longitudinally of the axle. Fig. 4 is a detail perspective view of the central portion of the front axle, illustrating the construction of the socket. Fig. 5 is a detail perspective view of the cap. Fig. 6 is an enlarged detail view of one of the spindles, illustrating the construction of the adjustable collar. Fig. 7 is a sectional view of the same.

Like numerals of reference indicate corresponding parts in all the figures of the drawings.

1 designates a front axle provided with a central socket 2, receiving a ball 3 of a reach 4, and provided at the back of the socket with a transverse opening 5, through which extends the reach, whereby the front axle is permitted the necessary horizontal swinging movement required for turning a vehicle. The reach 4 and the front axle are supported by an inclined brace $4^a$, which is slightly curved and which extends downward and forward from the reach to the lower face of the front axle at a point directly beneath the socket 2. The front axle is provided with a depending lug $1^a$, disposed centrally of the socket and fitting in a perforation of the front end of the brace $4^a$, which is secured on the lug by a nut, the lower portion of the lug being threaded for the reception of the nut. The rear end of the brace $4^a$ may be attached to the reach in any suitable manner, but is preferably provided with an integral clip-plate for the reception of the sides of a clip, which embraces the front portion of the reach. The depending lug $1^a$ forms a pivot for the front end of the brace $4^a$, which has a limited movement, or which permits the front axle to have the necessary movement for turning a vehicle.

The ball 3 is provided with a vertical stem 6, and is retained detachably in the socket by a cap 7, having a concavo-convex portion to fit over the top of the ball and provided with extensions 8, arranged in a flat recessed portion of the upper face of the axle 1. The extensions 8 are provided with tapering projections fitting in corresponding notches 9 of the axle, and secured therein by clips 10, embracing the cap and the front axle and located at opposite sides of the socket, and the tapering projections and corresponding notches 9 securely lock the cap against any accidental movement independent of the front axle.

The vertical stem 6 extends through an opening 11 of the cap, and is provided with a slightly-reduced threaded upper portion forming a shoulder and receiving a head-block 12, which is provided with a central threaded opening, and which is screwed down upon the shoulder at the lower terminus of the threaded portion of the stem.

The head-block 12 is slightly curved and is provided in its upper face with a longitudinal recess adapted to receive a suitable spring for supporting the front of a vehicle-body, and the spring is designed to be clipped to the head-block, as will readily be understood. The opening 11 of the cap is enlarged transversely of the running-gear to permit the necessary rocking movement, and it will be seen that the ball-and-socket construction dispenses with the ordinary fifth-wheel and that it possesses great strength and durability and is simple.

The rear end of the reach may be secured in any suitable manner to the rear axle, and the spindles of the axles are provided at their inner ends with collars 13, located adjacent to the body portion of the axles and provided with set-screws 14 for securing them at any desired adjustment. Each collar 13 is adapted to be advanced outward on its spindle to take up the wear and to avoid the necessity of cutting down spindles, trimming and rethreading them, and the set-screw has its head flush with the outer face of the collar.

It will be seen that the construction of running-gears is simplified, that the construction herein described possesses great strength and durability, and that the connection between the front axle and the head-block, and also the reach, permits and is adapted to yield to the necessary movements of the parts of the vehicle without straining or racking it. It will also be apparent that simple and effective means are provided for taking up the wear of spindles and that the necessity for cutting down or trimming axles is obviated.

Changes in the form, proportion, and the minor details of construction may be resorted to without departing from the principle or sacrificing any of the advantages of this invention.

What I claim is—

1. In a running-gear, the combination of an axle provided at its rear side with an opening and having an opening at its top, a reach extending through the rear opening and provided at its front end with a ball arranged in the said socket, and an upwardly-extending stem mounted on the ball and arranged in the top opening of the socket, substantially as and for the purpose described.

2. In a running-gear, the combination of an axle provided with a socket having an opening at the rear side thereof, a reach extending through said opening and provided with a ball arranged in the socket and having a stem extending upward, and a cap secured to the axle and confining the ball in the socket and provided with an opening receiving the stem, substantially as described.

3. In a running-gear, the combination of a front axle provided with a socket and having an opening at the rear side of the same, a reach extending through the opening and provided with a ball arranged in each socket, a stem rigid with the ball and extending upward therefrom and having an upper threaded portion forming a shoulder, a cap confining the ball in the socket and having extensions clipped to the axle and provided with a central opening receiving the stem, and a head-block provided with a threaded opening and mounted on the threaded portion of the stem, substantially as described.

4. In a running-gear, the combination of a front axle provided with a socket, a reach having a ball arranged in the socket, a stem rising from the ball and rigid therewith, and a head-block located above the axle and mounted on the stem and adapted to receive and support a spring, substantially as described.

In testimony that I claim the foregoing as my own I have hereto affixed my signature in the presence of two witnesses.

TELEMACHUS J. HERRING.

Witnesses:
J. A. DALEY,
H. I. WOOD.